Figure 1:
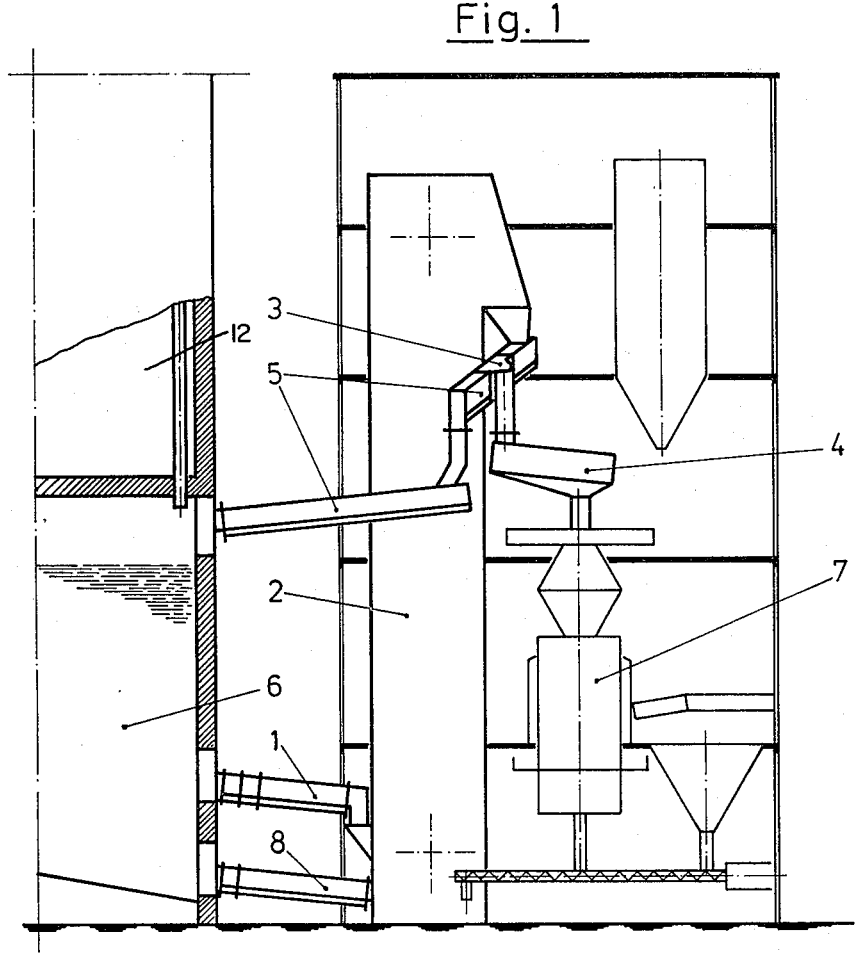

United States Patent [19]

Schalkhäuser

[11] 4,428,473
[45] Jan. 31, 1984

[54] FEEDING SYSTEM FOR BULK MATERIALS

[75] Inventor: Ulrich Schalkhäuser, Norderstedt, Fed. Rep. of Germany

[73] Assignee: Claudius Peters AG, Fed. Rep. of Germany

[21] Appl. No.: 314,454

[22] Filed: Oct. 23, 1981

[30] Foreign Application Priority Data

Oct. 25, 1980 [DE] Fed. Rep. of Germany ....... 3040343

[51] Int. Cl.$^3$ ...................... B65G 47/18; B65G 47/51
[52] U.S. Cl. .................................. 198/367; 198/541; 414/288; 53/504
[58] Field of Search ............... 414/268, 269, 270, 271, 414/318, 320, 325, 288; 198/580, 367, 541, 582; 222/252, 282, 283, 290, 330.56, 318; 53/504; 141/198

[56] References Cited

U.S. PATENT DOCUMENTS

| 1,462,660 | 7/1923 | Rollefson | 198/530 |
| 1,793,613 | 2/1931 | Hoefling | 198/580 |
| 2,628,724 | 2/1953 | Sackett | 414/288 |
| 3,229,828 | 1/1966 | Kucera | 414/318 |

FOREIGN PATENT DOCUMENTS 463789 3/1950 Canada ............................... 198/580

Primary Examiner—Robert B. Reeves
Assistant Examiner—Donald Hajec
Attorney, Agent, or Firm—Eric P. Schellin

[57] ABSTRACT

There is disclosed a continuously operating system for removing particulate material from the bottom portion of a suitable storage silo. The system includes a feed conveyer from the silo to a vertical uplifting conveyer whereby the particulate material is raised to a level sufficiently high to efficiently feed a packing system or the like. A by-pass arrangement whereby to return the particulate material to the vertical uplifting conveyer whenever the packing system is indicated.

1 Claim, 4 Drawing Figures

FEEDING SYSTEM FOR BULK MATERIALS

The invention relates to a feeding system for bulk materials which must be lifted and continuously fed at an elevated feeding point, but are received temporarily in a discontinuous manner.

Loading installations for loose bulk materials, continuously operating weighers and packing machines require within seconds a continuous bulk material supply. The absence or the interruption of a continuous bulk material flow impairs considerably the operation of such installations.

A larger bulk material supply is generally stored in bins or large-space silos. When this bulk material is, e.g., transloaded into vehicle tanks, there existed for this purpose generally two possibilities. Either the entire silo space is arranged at such a high level that the vehicles to be loaded can be supplied directly from the silo from the top to the bottom, or—for economic reasons—the large-space silo is placed on natural soil and a building is erected beside it wherein generally a vertical conveyer is required in order to convey the bulk material into a pre-bin via which it is subsequently conveyed to the loading device. In the same way this applies also to a packing plant where bulk materials are packed in bags. Such systems are described, e.g., in the periodical "Zement, Kalk, Gips", No. 12/1970, page 533 and page 564.

The pre-bin in these installations assures the effect that the bulk material can be continuously fed to such receivers and that the bulk material flow can be immediately stopped in case of interruption of the operation. Waiting periods for the start of the silo clearing by the vertical conveyer and the intermediate conveyers for the transportation from the large-space silo to the intermediate bin are taken up by a buffer volume which has been taken into account in the capacity of the pre-bin. At this state of the art, an elevated large-space silo may be suitable since such an additional building with the necessary accessories is very expensive.

The purpose of the invention is the lowering of the investment cost for such a building and the machinery, the simplification of the servicing of the individual machine parts there and the reduction of the energy consumption for the intermediate transportation. The problem is solved by dispensing with a pre-bin and guiding a bulk material reflux into a relief chamber arranged at the base of the bulk material silo.

By the omission of the pre-bin a substantially lower overall height and thus a reduction of the investment cost for the building are achieved. Besides, the bin is no longer necessary. By the lower conveying height necessary for the vertical conveyance of the bulk material energy expenses are saved. Fewer component parts and a better accessibility in a smaller building simplify of course also the servicing of the other devices. The omission of the pre-bin also entails a simplification of the control of the entire installation. The pre-bin is then replaced by an overflow device connected with a bulk material reflux path which leads into the relief chamber of a bulk material silo. An embodiment of such bulk material silos is illustrated in the periodical "Zement, Kalk, Gips", No. 12/1979, page 563.

According to a further characteristic of the invention, in place of a simple overflow device a switch may be installed in the bulk material device, which switch guides the bulk material flow coming from the lifting device to the feeding point, as well as to the relief chamber. The continuous bulk material flow is therefore at all times available to the receiver. By switching of the switch it is steered either in the direction of the feeding point or in the direction of the bulk material reflux path. In this manner it is also possible to supply several receiver stations, e.g., several packing devices or several loading points which are supplied individually as well as simultaneously. In this case several switches or several overflow points are required.

By a further development of the invention there may be provided, if the lifting device for the bulk material is a bucket conveyer, between the relief chamber of the storing silo and the bucket conveyer inlet, a second conveyer connection positioned below the first which connects the silo bottom with the bucket conveyer base. Depending on the construction of a bucket conveyer, a specific level difference between the bucket conveyer inlet and the bucket conveyer base results in each case. In order to bridge this level difference, a silo is either lifted or the bucket conveyer is arranged in a pit. According to this characteristic of the invention, the silo as well as the bucket conveyer can be placed on natural soil. Normally the bulk material flows via the upper discharge to the bucket conveyer. In a residue clearing of the silo the lower discharge is used. The latter leads to the base of the bucket conveyer. Depending on the scooping properties of a bucket conveyer, a temporarily reduced output cannot be excluded.

A second possibility to solve the problem, if no silo with relief chamber or no comparable silo with similar properties, such as mixing chamber silos or homogenization chamber silos is available, consists in that the bulk material reflux is guided into an auxiliary bin arranged beside the lifting device. In this case the pre-bin can also be dispensed with. The auxiliary bin, however, has not the same characteristics as the relief chamber of a silo. It can temporarily receive the bulk material reflux. In the meantime the bulk material flow from the main silo space is shut off. The feeding system moves then in a cycle, i.e., the bulk material transportation takes place via the lifting device, the bulk material reflux path and the auxiliary bin. In order to be able to maintain this cycle, a bulk material conveying connection between the auxiliary bunker outlet and the vertical conveyer becomes necessary. Of course, the auxiliary bin may also be arranged in such a manner that its outlet is situated directly above the conveying connection between the large-space silo or storing silo and the lifting device, so that then this bulk material conveying connection as additional connection is omitted.

The second solution is also characterized in that via a switch in the bulk material conveying device the bulk material flow between the lifting device and the feeding point as well as between the lifting device and the auxiliary bin is controllable.

When the lifting device is a bucket conveyer and a conveying connection exists from the auxiliary bin to the bucket conveyer inlet, a second connection positioned below the first between silo bottom and bucket conveyer base can be installed, so that both devices can be installed without pits and support frames at the same level.

For controlling the level in the auxiliary bin, filling level indicators known per se are provided.

A further advantage of such installations becomes obvious when a certain bulk material return transportation, which may be required by the type of installation, becomes necessary. Thus, e.g., in packing devices a certain leakage dust return transportation due to bag breakage, must be taken into account. Additional conveyers required for this purpose can be omitted since such bulk materials are re-fed to the lifting device installed anyway.

Figure 2:
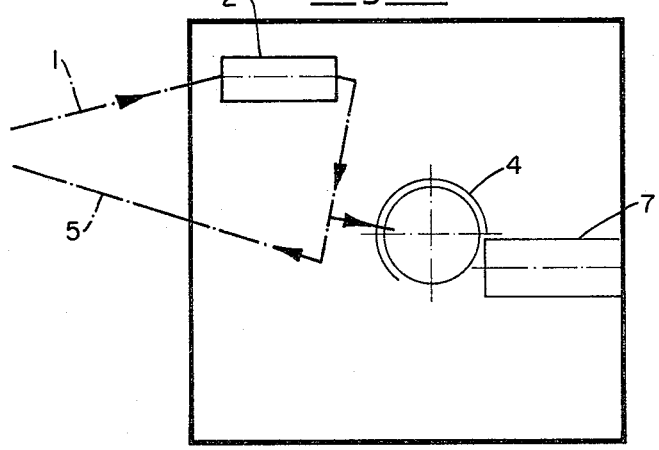
Figure 3:
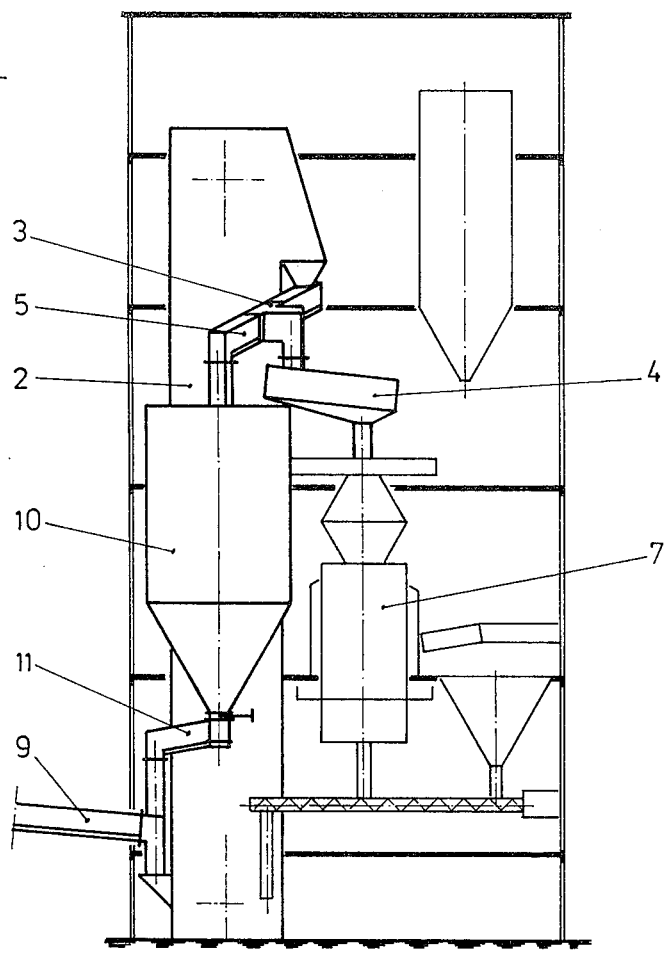

An embodiment of the invention is shown in the drawing and is described in greater detail in the following. There are shown:

FIG. 1, a feeding system wherein the bulk material is withdrawn from the relief chamber of a large-space silo;

FIG. 2, a plan view thereof;

FIG. 3, a feeding system with an auxiliary bin, and

Figure 4:
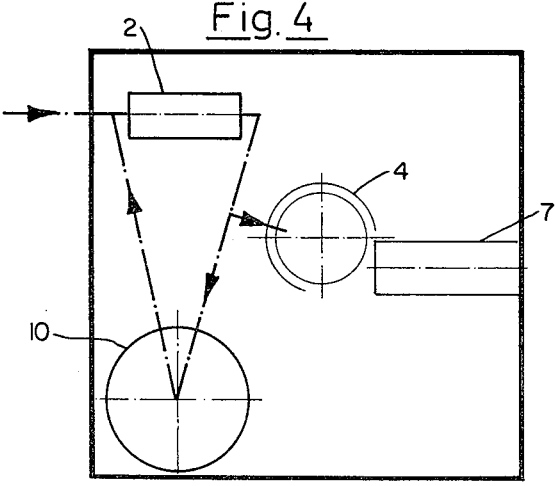

FIG. 4, a plan view thereof.

In FIG. 1, the bulk material transportation takes place via a bulk material conveyer 1, a bucket conveyer 2, a switch 3, either in the direction of a feeding point 4 or via a return flux 5 back to a relief chamber 6. The packing machine 7 shown here by way of example receives the bulk material directly from the bucket conveyer via switch 3 by way of which it reaches feeding point 4. A filling level probe of the packing machine controls switch 3. The main storage chamber 12 of the silo is located above the relief chamber 6.

When the packing operation is stopped the switch steers the bulk material flow via bulk material reflux path 5 into the relief chamber 6 of the silo. In the case of longer intermissions, the silo outlet is closed and the bulk material is discharged from the entire conveying path into the relief chamber of the silo.

With this system it is of course also possible to connect several silos containing different bulk material species with a feeding system. The operation of this system depends on a silo with relief chamber or a silo with similar possibilities as they may likewise be found, e.g., in mixing chamber silos and homogenization chamber silos.

FIG. 2 shows for clarification the plan view to FIG. 1. Here the individual transportation directions of the bulk material are marked by arrows.

The second transportation path for the residue clearing of the storage silo via a bucket conveyer is represented by a bulk material transportation path 8.

FIG. 3 shows a feeding system wherein likewise the feeding point is directly supplied, in which case, however, the overflow passes via an auxiliary bin. In the normal case the bulk material flows from a large-space silo via conveying path 9 to the bucket conveyer and via switch 3 either to feeding point 4, or via bulk material reflux path 5 to auxiliary bin 10. When this auxiliary bin has reached a specific filling level, the bulk material supply from the large-space silo is stopped and path 11 is opened. Thus the cycle is reestablished.

In this embodiment a packing machine 7 is shown below receiving point 4. In the case of interruption of the packing operation, a filling level probe of the packing machine controls switch 3.

In FIG. 4 the plan view relating to FIG. 3 is shown. Here the conveying directions relating to the conveying paths are marked by arrows.

In this arrangement it can be seen that in this case the distance between the feeding system and the large-space silo or storage silo plays no part.

I claim:

1. A discharge system for removing particulate material from a bulk particulate material containing silo comprising:

A bulk material conveyer means receiving said bulk particulate material from the bottom of said silo;

a bucket conveyer means adjacent said silo receiving said bulk particulate material from said bulk material conveyer;

a packing means;

a relief chamber in said silo adapted and constructed to contain a portion of said particulate material serving to separate the bulk material conveyer from the silo and being in communication with said main storage chamber of the bulk material coveyor and with the silo interior; and a switch means receiving said bulk material from said bucket conveyer means and normally delivering said bulk material to said packing means but being automatically operable when said packing means has a pre-determined quantity of said particulate material to divert said particulate material to said relief chamber from where said particulate material is again discharged to said bulk material conveyer.

* * * * *